United States Patent
Muramatsu et al.

(10) Patent No.: US 8,059,139 B2
(45) Date of Patent: Nov. 15, 2011

(54) DISPLAY CONTROLLER, DISPLAY CONTROL METHOD, DISPLAY CONTROL PROGRAM, AND MOBILE TERMINAL DEVICE

(75) Inventors: Seiji Muramatsu, Saitama (JP); Yoshimitsu Funabashi, Tokyo (JP); Mayu Irimajiri, Tokyo (JP); Atsushi Imai, Tokyo (JP); Keiko Hiraoka, Tokyo (JP); Takamoto Tsuda, Kanagawa (JP); Takeshi Matsuzawa, Kanagawa (JP); Takeshi Tanigawa, Tokyo (JP); Tomoharu Okamoto, Kanagawa (JP); Akihiko Adachi, Tokyo (JP); Tatsuhiko Nishimura, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 763 days.

(21) Appl. No.: 12/014,484

(22) Filed: Jan. 15, 2008

(65) Prior Publication Data
US 2008/0170075 A1    Jul. 17, 2008

(30) Foreign Application Priority Data
Jan. 16, 2007    (JP) .................................. 2007-006726

(51) Int. Cl.
*G09G 5/00*    (2006.01)
(52) U.S. Cl. ........................................................ 345/636
(58) Field of Classification Search .................. 345/629, 345/636
See application file for complete search history.

(56) References Cited

U.S. PATENT DOCUMENTS

| | | | | |
|---|---|---|---|---|
| 5,854,850 | A * | 12/1998 | Linford et al. | 382/128 |
| 6,259,457 | B1 * | 7/2001 | Davies et al. | 345/629 |
| 6,856,414 | B1 * | 2/2005 | Haneda et al. | 358/1.15 |
| 6,972,774 | B2 * | 12/2005 | Eguchi | 345/629 |
| 7,620,622 | B1 * | 11/2009 | Larsson et al. | 1/1 |
| 7,627,556 | B2 * | 12/2009 | Liu et al. | 1/1 |
| 2002/0136458 | A1 * | 9/2002 | Nagasaka et al. | 382/209 |
| 2003/0037058 | A1 * | 2/2003 | Hatori | 707/102 |
| 2003/0063321 | A1 * | 4/2003 | Inoue et al. | 358/302 |
| 2004/0078389 | A1 * | 4/2004 | Hamilton | 707/104.1 |
| 2004/0125150 | A1 * | 7/2004 | Adcock et al. | 345/810 |
| 2005/0169558 | A1 * | 8/2005 | Dance et al. | 382/305 |
| 2005/0225669 | A1 * | 10/2005 | Tsai et al. | 348/383 |
| 2005/0246336 | A1 * | 11/2005 | Stauder et al. | 707/6 |
| 2006/0156259 | A1 * | 7/2006 | Wagner et al. | 715/963 |
| 2007/0180372 | A1 * | 8/2007 | Graham | 715/531 |

FOREIGN PATENT DOCUMENTS
JP    2004-325937    11/2004

* cited by examiner

*Primary Examiner* — Ryan R Yang
(74) *Attorney, Agent, or Firm* — Oblon, Spivak, McClelland, Maier & Neustadt, L.L.P.

(57) ABSTRACT

A display controller includes a character display unit for displaying character information on a display unit; a keyword detecting unit for detecting a predetermined keyword from the character information displayed by the character display unit; an image information detecting unit for detecting image information including additional information corresponding to the keyword detected by the keyword detecting unit, from image information including predetermined additional information and stored in a storing unit; and a thumbnail image displaying unit for displaying on the display unit a thumbnail image(s) of the image information detected by the image information detecting unit.

11 Claims, 4 Drawing Sheets

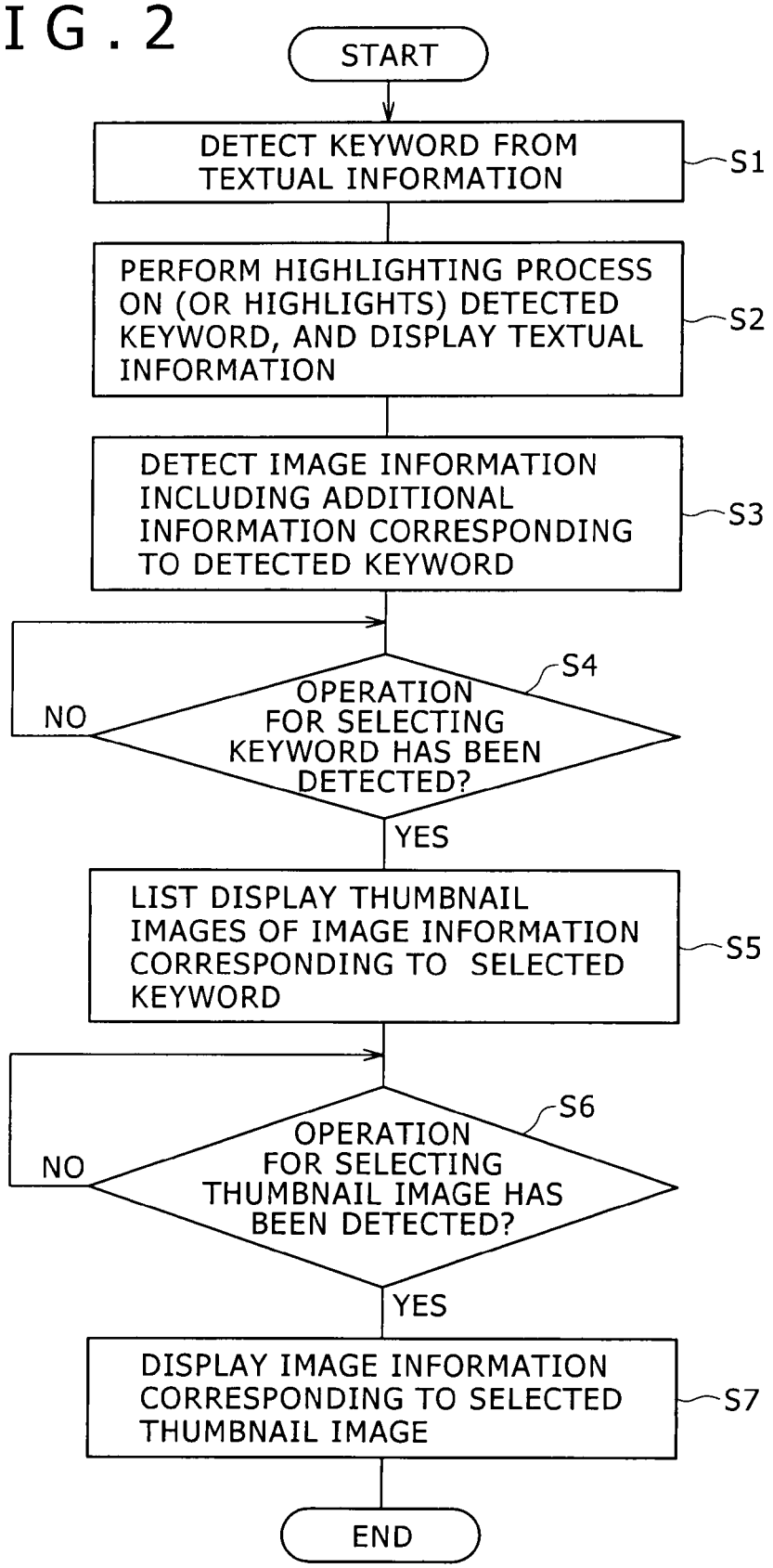

DISPLAY CONTROLLER, DISPLAY CONTROL METHOD, DISPLAY CONTROL PROGRAM, AND MOBILE TERMINAL DEVICE

CROSS REFERENCES TO RELATED APPLICATIONS

The present invention contains subject matter related to Japanese Patent Application JP 2007-006726 filed in the Japanese Patent Office on Jan. 16, 2007, the entire contents of which being incorporated herein by reference.

BACKGROUND OF THE INVENTION

1. Technical Field of the Invention

The present invention relates to a display controller, a display control method, a display control program, and a mobile terminal device that are well suited for adaptation to apparatuses handling character information and image information displayed on any one of apparatuses, such as such as mobile phones, PHS phones (PHS: personal handyphone system), and PDAs (PDA: personal digital assistant), and notebook/desktop personal computers. More specifically, the present invention relates to a display controller, a display control method, a display control program, and a mobile terminal device in which image information related to to-be-displayed character information can be automatically retrieved and displayed.

2. Description of the Related Art

Japanese Unexamined Patent Application Publication No. 2004-325937 (pp. 5-6: FIG. 4) discloses an image display controller in which, during sequential display of a plurality of still images, in which the images are displayed one by one, the display time period of the still image can be changed.

In the case of the image display controller, when a first button of a remote controller is depressed during serial display of still images, a display changing interval of the respective still image for serial display is reduced, thereby to perform high speed display changing of the still images. Alternatively, when a second button of the remote controller is depressed during sequential display of still images, a display switching time interval between display of still images for sequential display is increased, thereby to perform low speed display changing of the still images. Thus, even during sequential display of still images, the display time period of the respective still image can be changed.

Hitherto, information stored in the apparatus are managed separately depending on the type of information as in a case where, for example, e-mail information is managed as the type of e-mail information, and image information is managed as the type of image information. As such, in the event of retrieving desired image information from among many pieces of image information stored in memory, retrieval is performed in any one of the following manners. One manner is that the desired image information is retrieved in accordance with information memorized by a user. Another manner is that thumbnail images of the respective image information are list-displayed and a desired image is retrieved while viewing the thumbnail image list-displayed. Another manner is that, as in the image display controller disclosed in Japanese Unexamined Patent Application Publication No. 2004-325937, the many pieces of image information are displayed one by one, and the desired image information is retrieved therefrom.

However, image information, such as those having been unretrievable and/or having not been remembered as the user has forgotten the image capture event therefor miss opportunities of display and the like, such that the image information are cannot be effectively used despite the images were captured.

Under these circumstances, it would be desirable to provide a display controller, a display control method, a display control program, and a mobile terminal device that handle character information and image information in correlation with one another, and that, in the event of displaying the character information, automatically display thumbnail images of the image information correlated to the to-be-displayed character information, thereby to effectively exploit image information stored in memory.

SUMMARY OF THE INVENTION

According to one embodiment of the present invention, a display controller includes a character display unit for displaying character information on a display unit; a keyword detecting unit for detecting a predetermined keyword from the character information displayed by the character display unit; an image information detecting unit for detecting image information including additional information corresponding to the keyword detected by the keyword detecting unit, from image information including predetermined additional information and stored in a storing unit; and a thumbnail image displaying unit for displaying on the display unit a thumbnail image(s) of the image information detected by the image information detecting unit.

According to another embodiment of the present invention, a display control method includes the steps of displaying character information on a display unit; detecting a predetermined keyword from the character information displayed in the step of displaying image information; detecting image information including additional information corresponding to the keyword detected in the step of detecting a predetermined keyword, from image information including predetermined additional information and stored in a storing unit; and displaying on the display unit a thumbnail image(s) of the image information detected in the step of detecting image information.

According to another embodiment of the present invention, a display control program to be operated in a computer, the program includes a function of displaying character information on a display unit; a function of detecting a predetermined keyword from the character information displayed by the function of displaying image information; a function of detecting image information including additional information corresponding to the keyword detected by the function of detecting a predetermined keyword, from image information including predetermined additional information and stored in a storing unit; and a function of displaying on the display unit a thumbnail image(s) of the image information detected by the function of detecting image information.

According to still another embodiment of the present invention, a mobile terminal device includes a character display unit for displaying character information on a display unit; a keyword detecting unit for detecting a predetermined keyword from the character information displayed by the character display unit; a storing unit for storing image information including predetermined additional information; an image information detecting unit for detecting image information including additional information corresponding to the keyword detected by the keyword detecting unit, from image information stored in the storing unit; and a thumbnail image displaying unit for displaying on the display unit a thumbnail image(s) of the image information detected by the image information detecting unit.

According to the respective embodiments, predetermined additional information is added to respective image information stored in the storing unit (in units of the respective image information). When displaying character information on the display unit, a keyword is detected from the to-be-displayed character information. Then, from among still images contained in the storing unit, image information to which additional information related to the detected keyword are detected, and thumbnail images of the detected image information are list-displayed.

Thereby, the character information and the respective still image content can be handled in correlation with one another. Thereby, thumbnail images of image information corresponding to to-be-displayed character information can be automatically displayed, such that respective thumbnail images contained in the storing unit can be exploited.

As can be understood from the above, according to the respective embodiments, character information and respective still image content can be handled in correlation with one another. Thereby, in the event of displaying character information, thumbnail images of image information related to the to-be-displayed character information can be automatically displayed, such that respective thumbnail images contained in the storing unit can be exploited.

Further, the presence of a still image content related to character information being displayed can be automatically notified to the user. Consequently, the number of opportunities for display of, for example, still images forgotten by the user or difficult for the user to remember or to find can be increased, thereby to assist, for example, reviving remembrance of the user.

BRIEF DESCRIPTION OF THE DRAWINGS

These and other objects, features and advantages of the present invention will be apparent from the following detailed description and the appended claims and drawings, in which:

FIG. 2 is an explanatory flow diagram showing operation for displaying thumbnail images of image information correlated with to-be-displayed character information in the mobile phone of the embodiment;

DETAILED DESCRIPTION OF THE PREFERRED EMBODIMENTS

The present invention can be adapted to a mobile phone. (Electrical Configuration of Mobile Phone)

Figure 1:
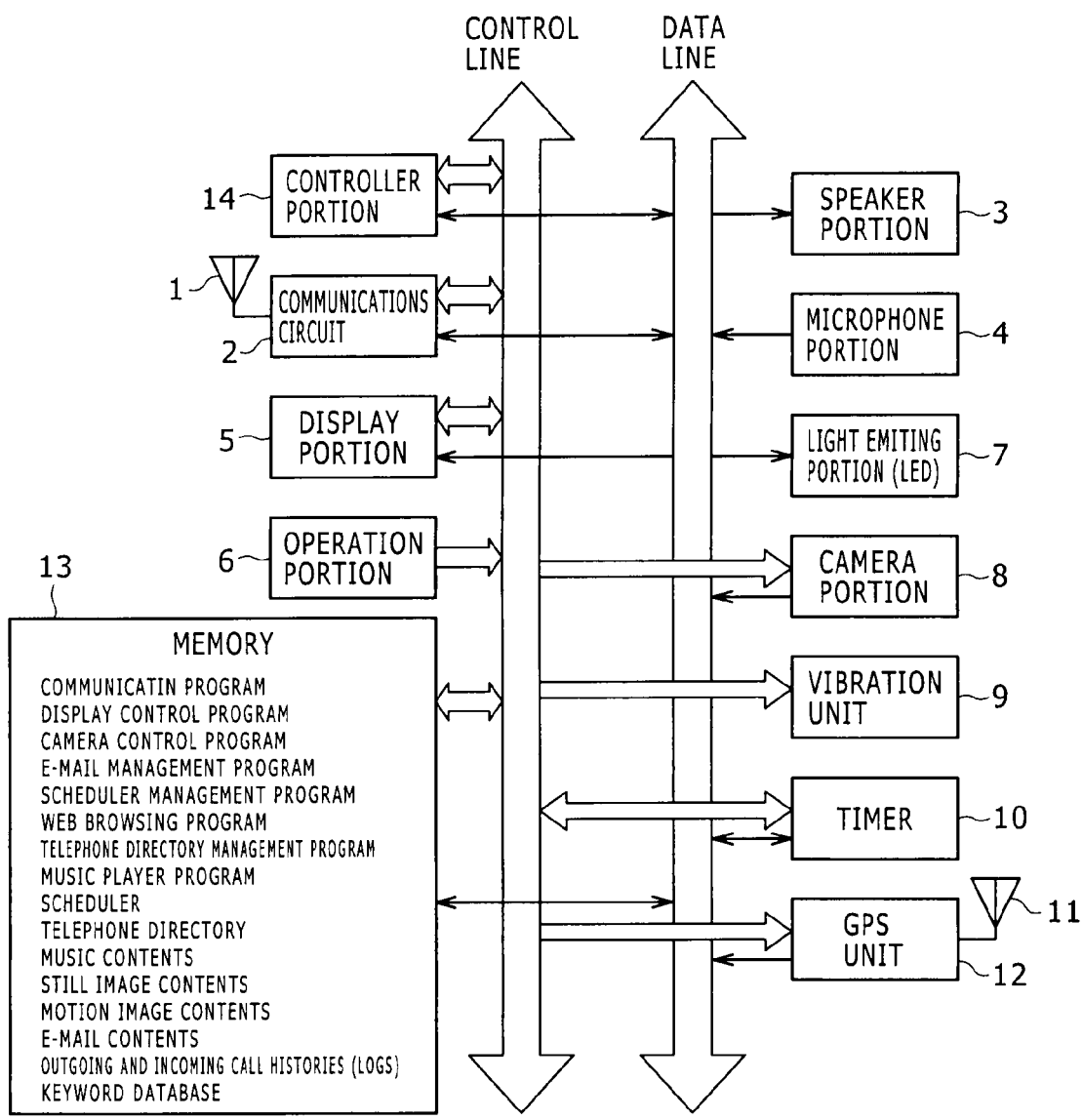
FIG. 1 is a block diagram of a mobile phone in accordance with an embodiment of the present invention.

With reference to FIG. 1, a mobile phone of an embodiment of the present invention includes an antenna 1 and a communications circuit 2 for performing wireless communication a base station; a speaker portion 3 for obtaining acoustic outputs such as incoming sounds and receiving audio; a microphone portion 4 for receiving or collecting transmitting audio; a display portion 5 for displaying images (motion and/or still images, for example) and characters; an operation portion 6 for performing operation such as character entry and menu selection of a desired menu (or a menu item); a light emitting portion 7 formed of an LED (light emitting diode) for optically notifying the user of, for example, outgoing and incoming calls; a camera portion 8 for capturing of still images and motion images of desired subjects; a vibration portion 9 used for notifying a user of, for example, outgoing and incoming calls by vibrating a housing of the mobile phone; a timer 10 for counting the current time; and an antenna 11 and a GPS unit 12 (GPS: global positioning system) for detecting the current position of the mobile phone.

The mobile phone further includes a memory 13 and a controller portion 14. The memory 13, which is a non-transitory computer readable storage medium, contains, for example, a communication processing programs (communication program) for performing wireless communication processing via the base station, various application programs, and various types of data (contents) to be handled by the respective application programs. The controller portion 14 provides total control of the mobile phone (the controller portion 14 provides various types of control operations, but such control operations hereinbelow will not be described on each occasion unless otherwise necessary).

More specifically, the memory 13 contains various types of programs. They are a camera control program providing functions, such as an image capture control operation of the camera unit 8, and a viewer function for motion and still images that are captured or acquired by the camera unit 8 or that are extracted across a network and an input terminal; an e-mail management program for controlling, for example, e-mail creation and transmission and reception; a scheduler management program for managing a scheduler in which user schedules are stored; a web browsing program for viewing or browsing web sites resident on a predetermined network, such as the Internet; a telephone directory management program for managing a telephone directory; and a music player program for performing playback of music contents.

The memory 13 further contains a keyword database and a display control program. The keyword database contains keywords that, respectively, are detected from to-be-displayed characters in the event of display of characters of, for example, a homepage of a web site. The display control program operates for retrieving image information (such as a still image content or a motion image content) including additional information corresponding to a respective keyword to be detected from a to-be-displayed character and for displaying a thumbnail image of the respectively detected image information.

The memory 13 further contains various other data such as, for example:

a scheduler in which desired schedules of the user are stored; a telephone directory storing still images, telephone numbers, e-mail addresses, and birthdays of acquaintances and friends of the user;

music contents to be played back in accordance with the music player program;

still and motion image contents to be played back in accordance with the viewer function of the camera control program;

e-mail contents transmitted and received; and transmitted and received call logs of transmitted and received telephone calls and e-mail pieces.

(Additional Information to Still Image Contents)

"Still image contents" are contained into the memory 13, as described above. When a respective still image is stored into the memory 13, the image is stored thereinto with additional information added thereto. The additional information for the respective still image content includes, for example, capture time/storage time information, managing title (caption (subject name)), file type information, file size information, acquisition source information, and capture position information.

The capture time information represents information of time that is measured by the timer 10. When storing a still image captured or acquired by the camera unit 8 into the memory 13, the information of time is extracted and added by the controller portion 14 to a still image content.

However, still images include those of the type downloaded from predetermined web sites, for example. A still image of this type is not provided with capture time information. In the case of such a still image, when storing a still image content into the memory 13, the controller portion 14 extracts information of time (=storage time) from the timer 10, and then adds the information of time to the still image.

The managing title is data indicative of a title of a still image content. When storing a still image content captured by the camera unit 8 into the memory 13, the controller portion 14 automatically adds to the still image content an image date and capture time corresponding to current time information extracted from the timer 10. That is, initially, as a managing title of a still image content captured by the camera unit 8, the capture date and capture time are automatically added to the still image.

The managing title is editable after the still image content has been stored into the memory 13. For editing a managing title, the user displays a managing-title edit screen at a desired timing and operates the operation portion 6, thereby inputting the managing title on the screen. In response, the controller portion 14 overwrites the managing title input by the user with the capture date and capture time automatically added to the still image content. Thereby, the managing title of the still image content is altered to a desired managing title.

For a still image content already having an added managing title among still image contents acquired by, for example, downloading from predetermined web sites, the controller portion 14 handles the added managing title as it is. For a still image content without having an added managing title, however, the controller portion 14 automatically adds the date and time of the download operation as a managing title. Even such an automatically added managing title is arbitrarily alterable by the user on the managing title edit screen.

The file type information is information indicative of an image format of a still image content. More specifically, information indicative of any one of various formats, such as JPEG (Joint Photographic Experts Group), GIF (Graphic Interchange Format), and SWF ("Shockwave Flash" (registered trademark)), is added to the still image content.

The file size information is information indicative of the file size of a still image content. For example, a more specifically, a numeric value representing a file size of, for example, 45 k bytes or 2M bytes, is added to the still image content.

The acquisition source information is information indicative of an acquisition source of the still image content. For example, to a still image content captured by the camera unit 8, there is added information indicative that the acquisition source of the content is the camera portion 8. Alternately, to, for example, a still image content downloaded from a predetermined web site, there is added information indicative that the acquisition source is the web site.

The capture position information represents current position information to be added to a still image content captured by the camera portion 8. In the image capturing event, the current position information is detected by the antenna 11 and the GPS unit 12, is extracted and added as the capture position information by the controller portion 14 to the still image content.

For a still image content already having added capture position information among still image contents acquired by, for example, downloading from predetermined web sites, the controller portion 14 handles the added managing title as it is. For a still image content without having capture position information, however, the controller portion 14 automatically adds current position information detected by the antenna 11 and the GPS unit 12 in the downloading event is added as the capture position information to the still image content.

(Display Operation for Displaying Image Information Related to Character Information)

According to the mobile phone of the present embodiment, characters in, for example, a homepage at a web site, is displayed on the display portion 5, a still image related to the to-be-displayed characters is automatically retrieved and displayed. FIG. 2 is a flow diagram showing the flow of a display operation for displaying image information related to the characters. Processing in the flow diagram of FIG. 2 is started with the timing of detection of textual information (character information) in, for example, an e-mail, schedule, or homepage resident at a web site in accordance with the display control program stored in the memory 13.

At step S1, the controller portion 14 attempts to detect a desired keyword identical to or matching one of keywords stored in the keyword database stored in the memory 13 from textual information intended to be displayed on the display portion 5. As specific examples, keywords stored in the keyword database include place names, such as "Shinagawa," "Shinbashi," "Ginza," "Tokyo," "Sapporo," and "Hokkaido;" resort names, such as "amusement park," "zoo," "aquarium," "XYZ theme park," "XYZ momijien (colorful-autumn-leave featured garden);" building names, such a "XYZ building" and "XYZ hills"; national event dates, such as "February 14th (St. Valentine's Day)," "May 5th (Children's Day)," and "December 24th (Christmas Eve);" and event names, such as "meal meeting," "athletic meet," "cultural festival;" sports names, such as "baseball," "soccer," "volleyball," "swimming;" and date-related terms or phrases, such as "yesterday," "today," "tomorrow," "day after tomorrow."

Further contained in the keyword database in the memory 13 include keywords representing, for example, positional information of, for example, respective buildings and resorts. In the present example, description will be continued contemplating that the positional information of, for example, respective buildings and resorts are stored in the keyword database. However, such positional information of, for example, respective buildings and resorts may be acquired in the manner that the controller portion 14 accesses to a server on a predetermined network providing a distribution service for such positional information of, for example, respective buildings and resorts.

Thus, the controller portion 14 attempts to detect a desired keyword matching one of keywords stored in the keyword database from textual information intended to be displayed on the display portion 5. If the desired keyword matching one of keywords stored in the keyword database is not present in the textual information intended to be displayed on the display portion 5, then the processing of the flow diagram in FIG. 2 simply terminates.

Subsequently, at step S2, characters for use as the keyword detected from the textual information are subjected to a highlighting process and then are displayed on the display portion 5. The highlighting process is performed for the characters in such a manner that an underline or underscore, for example, is added to the characters, or the display color of the characters is changed, or the display luminance of the characters is increased (that is, the characters are highlighted).

Figure 3A:
FIGS. 3A to 3C are explanatory views showing operation for displaying thumbnail image of image information correlated with to-be-displayed character information in the mobile phone of the embodiment.

FIG. 3A is a view showing a display example of a received e-mail content including keywords subjected to the highlighting process (or, "highlighted," hereinbelow) in text (message text). More specifically, in the example shown in FIG. 3A, the keywords "yesterday" and "amusement park" are included in the text of the received e-mail content. In this case, the highlighting process is performed by adding, for example, underscores to the respective keywords "yesterday" and "amusement park," and then the text is displayed. The highlighting process is performed in a similar manner in the event of display of textual information contained in an other object, such as schedule, homepage at a web site, or notepad. In this case also, the controller portion 14 operates to detect a keyword(s) similar to the predetermined keyword(s), highlight text including the keyword(s), and display the text on the display portion 5.

Referring back to the flow diagram, the processing described above enables the user to recognize that the memory 13 contains a still image content(s) corresponding to the highlighted keyword.

Subsequently, at step S3, the controller portion 14 detects from the memory 13 still image contents including additional information corresponding to the keyword detected from the textual information. More specifically, in the case of the example shown in FIG. 3A, the text of the e-mail content includes the keyword "yesterday." As such, the controller portion 14 detects from the memory 13 the still image contents to which is added capture time/storage time information corresponding to the previous date of a reception date of the received e-mail content.

In addition, since the text of the received e-mail content includes the keyword "amusement park," the controller portion 14 detects from the memory 13 a still image content to which the characters "amusement park" is added as managing title.

Alternatively, in a case where a proper name, such as "xyz land" or "xyz zoo," has been detected as a keyword, the controller portion 14 detects from the memory 13 a still image content to which the proper name is added as the managing title. Still alternatively, in the case of, for example, an amusement park or building indicated with a proper name, also the positional information of an existing place thereof is supposed to be known. As such, the controller portion 14 detects positional information corresponding to the detected proper name from the keyword database, and then detects from the memory 13 a still image content to which the positional information detected from the keyword database is added as the additional information.

More specifically, the controller portion 14 detects from the memory 13 not only still image contents corresponding to the keyword, but also still image contents including the additional information related to the keyword.

Subsequently, when specifying display of thumbnail images of the still image contents corresponding to the highlighted keyword, the user performs a predetermined operation by operating the operation portion 6 to perform display specification operation. At step S4, the controller portion 14 monitors presence or absence of the display specification operation; and at the timing of detection of the display specification operation. Then, the processing proceeds to step S5.

Figure 3B:
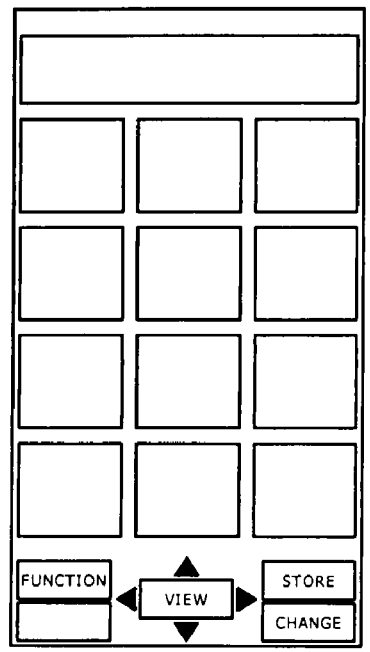

At step S5, the controller portion 14 performs display control for display of thumbnail images. More specifically, thumbnail images of the still image contents including additional information corresponding to the keyword subjected to the display specification operation are formed (that is, thumbnail images of the still image content detected at step S3 are formed. Then, as shown in FIG. 3B, the formed thumbnail images are list-displayed on the display portion 5. As an example, in the case of the example shown in FIG. 3A, on the display portion 5, there are list-displayed thumbnail images of the still image contents captured (or stored) on the previous date of the reception date of the received e-mail contents.

As another example, on the display portion 5, there are list-displayed thumbnail images of related still image contents. They are, for example, still image contents to which are added additional information such as "at an amusement park" or "Ferris wheel in the amusement park" related to the keyword "amusement park," and thumbnail images of still image contents including positional information of the amusement park as the additional information.

Thereby, character information and a respective still image content can be handled in correlation with one another. In the event of displaying of character information, a thumbnail image of a still image content correlated to the to-be-displayed character information is automatically displayed, such that respective thumbnail images contained in the memory 13 can be exploited.

Further, the presence of a still image content related to character information being displayed can be automatically notified to the user. Consequently, the number of opportunities for display of, for example, still images forgotten by the user or difficult for the user to remember or to find can be increased, thereby to assist, for example, reviving remembrance of the user.

Suppose that the user desire to display a still image content corresponding to a desired thumbnail image of list-displayed thumbnail images on the display screen. In such a case, the user moves a cursor to be placed on the desired thumbnail image on the screen by operating the operation portion 6, and then depresses the enter key.

Figure 3C:
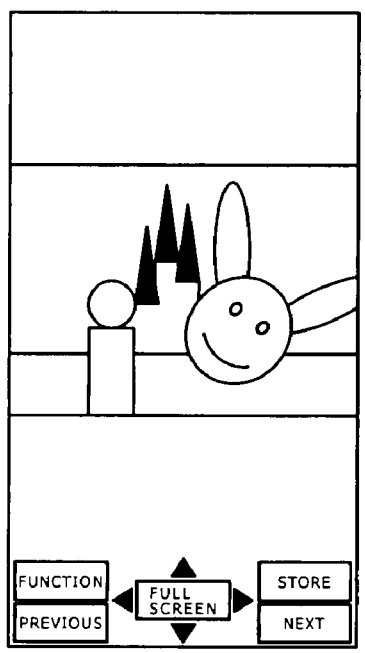

The presence or absence of the display specification operation is monitored by the controller portion 14, as described above. At the timing of detection of the display specification operation performed to display the still image content, the processing proceeds to step S7. At step S7, as shown in FIG. 3C for example, a still image content corresponding to a thumbnail image selected by the user from among list-displayed thumbnail images is displayed on the display portion 5. Then, the processing shown in the flow diagram of FIG. 2 terminates.

Thus, in the example described above, the still image content corresponding to the thumbnail image selected from the list-displayed thumbnail images is displayed. However, the processing is not limited thereto. Suppose that a desired thumbnail image be selected from among the list-displayed thumbnail image. In such a case, a creation screen for e-mail having an attached file of the still image content corresponding to the thumbnail image may be automatically activated (in the case of HTML mail, the still image content can be pasted onto a text portion of the activated e-mail creation screen).

Alternatively, the arrangement may be such that, in the event a desired thumbnail image is selected from among list-displayed thumbnail images, a so-called "bookmark" is added to make it possible to view the content later. Alternatively, the arrangement may be such that respective still image contents corresponding to list-displayed thumbnail images can be collectively moved or copied into a desired folder.

Effects/Advantages of Embodiment

As can be clearly known from the above description, according to the mobile phone of the embodiment, additional information, such as managing title, capture date (capture time), and capture site (positional information), are added to a respective still image content (in units of each still image content). When displaying character information in, for example, e-mail content or schedule content (content in the scheduler), a keyword is detected from the to-be-displayed character information. Then, from among still images contained in the memory 13, still images to which additional information related to the detected keyword are detected, and thumbnail images of the detected still image contents are list-displayed on the display portion 5.

Thereby, the character information and the respective still image content can be handled in correlation with one another. In the event of displaying of character information on the display portion 5, a thumbnail image of a still image content correlated to the to-be-displayed character information is automatically displayed on the display portion 5, such that respective thumbnail images contained in the memory 13 can be exploited.

Further, the presence of a still image content related to character information being displayed on the display portion 5 can be automatically notified to the user. Consequently, the number of opportunities for display of, for example, still images forgotten by the user or difficult for the user to remember or to find can be increased, thereby to assist, for example, reviving remembrance of the user.

MODIFIED EXAMPLES

Figure 4:
FIG. 4 is an explanatory view showing operation for displaying thumbnail image of image information correlated with to-be-displayed character information in the mobile phone of the embodiment.

As can be known from FIGS. 3A and 3B, in the embodiment described above, the thumbnail images are list-displayed separately from the textual information. However, as shown in FIG. 4, the thumbnail image may be list-displayed together with the textual information. In this case also, the same effects/advantages can be obtained.

Figure 5:
FIG. 5 is an explanatory view showing operation for displaying thumbnail image of image information correlated with to-be-displayed character information in the mobile phone of the embodiment.

Alternatively, as shown in FIG. 5, either a thumbnail image corresponding to a keyword may be displayed closed to the keyword. In this case, an icon (or a message) indicative of the presence of the still image content may instead be displayed on the display portion 5. Even in this case, the same effects/advantages as those described above can be obtained.

Thus, the embodiment and modified examples thereto have been described contemplating that the present invention is adapted to the mobile phone. However, effects similar to the above described can be attained by adapting the present invention to any one of other devices, such as PHS phones (PHS: Personal Handyphone System), PDA apparatuses (PDA: Personal Digital Assistant), notebook/desktop personal computers, and mobile game machines inasmuch as the devices handle character information and image information.

The present invention is not limited to the embodiment and modified examples each described above just by way of one example of the invention, but of course, even embodiments other than the above-described embodiment may be made with various modifications without departing technical spirit and scope of the present invention.

What is claimed is:

1. A display controller comprising:
a character display means for displaying at least one word on a display means;
a keyword detecting means for detecting whether a predetermined keyword is included in the at least one word to be displayed by the character display means by comparing the at least one word to be displayed to a plurality of predetermined keywords stored in a keyword database;
an image information detecting means for detecting whether image information includes additional information which corresponds to the predetermined keyword detected by the keyword detecting means, from image information including predetermined additional information and stored in storing means; and
a thumbnail image displaying means for displaying on the display means at least one thumbnail image of the image information detected by the image information detecting means which includes the additional information that corresponds to the predetermined keyword,
wherein the thumbnail image displaying means operates so that each thumbnail image detected by the image information detecting means is displayed on the display means together with the at least one word being displayed by the character display means, each thumbnail image being displayed on the display means in a horizontal row at a position below the predetermined keyword.

2. A display controller as claimed in claim 1, wherein
the keyword detecting means performs a highlight display process so that a word being used as the detected predetermined keyword among the at least one word displayed by the character display means is highlighted and displayed on the display means; and
when a selection operation has been performed to select the keyword used as the word subjected to the highlight display process of the keyword detecting means, the thumbnail image displaying means operates so that, among the image information detected by the image information detecting means, thumbnail images of the image information corresponding to the selected keyword are list-displayed on the display means.

3. A display controller as claimed in claim 1, wherein the thumbnail image displaying means operates so that the thumbnail images of the image information selected by the image information detecting means are list-displayed on a remaining display field on the display means where the at least one word is being displayed.

4. A display controller as claimed in claim 1, wherein the keyword detecting means detects whether the at least one word to be displayed includes the predetermined keyword by determining whether the at least one word to be displayed is identical to one of the plurality of predetermined keywords stored in the keyword database.

5. A display controller comprising:
a character display unit for displaying at least one word on a display unit;
a keyword detecting unit for detecting whether a predetermined keyword is included in the at least one word to be displayed by the character display unit by comparing the at least one word to be displayed to a plurality of predetermined keywords stored in a keyword database;
an image information detecting unit for detecting whether image information includes additional information which corresponds to the predetermined keyword detected by the keyword detecting unit, from image information including predetermined additional information and stored in the storing unit; and
a thumbnail image displaying unit for displaying on the display unit at least one thumbnail image of the image information detected by the image information detecting unit which includes the additional information that corresponds to the predetermined keyword, wherein the thumbnail image displaying unit operates so that each thumbnail image detected by the image information detecting unit is displayed on the display unit together with the at least one word being displayed by the character display unit, each thumbnail image being displayed on the display unit in a horizontal row at a position below the predetermined keyword.

6. A display controller as claimed in claim 5, wherein the keyword detecting unit performs a highlight display process so that a word being used as the detected predetermined keyword among the at least one word displayed by the character display unit is highlighted and displayed on the display unit; and when a selection operation has been performed to select the keyword used as the word subjected to the highlight display process of the keyword detecting unit, the thumbnail image displaying unit operates so that, among the image information detected by the image information detecting unit, thumbnail images of the image information corresponding to the selected keyword are list-displayed on the display unit.

7. A display controller as claimed in claim 5, wherein the thumbnail image displaying unit operates so that the thumbnail images of the image information selected by the image information detecting unit are list-displayed on a remaining display field on the display unit where the at least one word is being displayed.

8. A display control method, implemented on a display controller, comprising:

displaying at least one word on a display means;

detecting whether a predetermined keyword is included in the at least one word to be displayed in the step of displaying image information by comparing the at least one word to be displayed to a plurality of keywords stored in a keyword database;

detecting whether image information includes additional information which corresponds to the predetermined keyword detected in the step of detecting a predetermined keyword, from image information including predetermined additional information and stored in storing means; and displaying on the display means at least one thumbnail image of the image information detected in the step of detecting image information which includes the additional information that corresponds to the predetermined keyword, wherein each detected thumbnail image is displayed on the display means together with the at least one word being displayed, each detected thumbnail image being displayed on the display means in a horizontal row at a position below the predetermined keyword.

9. A non-transitory computer readable storage medium for storing therein a display control program that includes instructions which when executed on a computer, causes the computer to execute a method comprising:

displaying at least one word on a display means;

detecting whether a predetermined keyword is included in the at least one word to be displayed by the step of displaying image information by comparing the at least one word to be displayed to a plurality of keywords stored in a keyword database;

detecting whether image information includes additional information which corresponds to the predetermined keyword detected by the step of detecting a predetermined keyword, from image information including predetermined additional information and stored in storing means; and displaying on the display means at least one thumbnail image of the image information detected by detecting image information which includes the additional information that corresponds to the predetermined keyword, wherein each detected thumbnail image is displayed on the display means together with the at least one word being displayed, each detected thumbnail image being displayed on the display means in a horizontal row at a position below the predetermined keyword.

10. A mobile terminal device comprising:

a character display means for displaying at least one word on a display means;

a keyword detecting means for detecting whether a predetermined keyword is included in the at least one word to be displayed by the character display means by comparing the at least one word to be displayed to a plurality of keywords stored in a keyword database;

a storing means for storing image information including predetermined additional information;

an image information detecting means for detecting whether image information includes additional information which corresponds to the predetermined keyword detected by the keyword detecting means, from image information stored in the storing means; and a thumbnail image displaying means for displaying on the display means at least one thumbnail image of the image information detected by the image information detecting means which includes the additional information that corresponds to the predetermined keyword, wherein the thumbnail image displaying means operates so that each thumbnail image detected by the image information detecting means is displayed on the display means together with the at least one word being displayed by the character display means, each thumbnail image being displayed on the display means in a horizontal row at a position below the predetermined keyword.

11. A mobile terminal device comprising:

a character display unit for displaying at least one word on a display unit;

a keyword detecting unit for detecting whether a predetermined keyword is included in the at least one word to be displayed by the character display unit by comparing the at least one word to be displayed to a plurality of keywords stored in a keyword database;

a storing unit for storing image information including predetermined additional information;

an image information detecting unit for detecting whether the image information includes additional information which corresponds to the predetermined keyword detected by the keyword detecting unit, from image information stored in the storing unit; and a thumbnail image displaying unit for displaying on the display unit at least one thumbnail image of the image information detected by the image information detecting unit which includes the additional information that corresponds to the predetermined keyword, wherein the thumbnail image displaying unit operates so that each thumbnail image detected by the image information detecting unit is displayed on the display unit together with the at least one word being displayed by the display unit, each thumbnail image being displayed on the display unit in a horizontal row at a position below the predetermined keyword.

* * * * *